H. SPRINGER.
Seed-Drill-Tooth.
No. 203,207. Patented April 30, 1878.
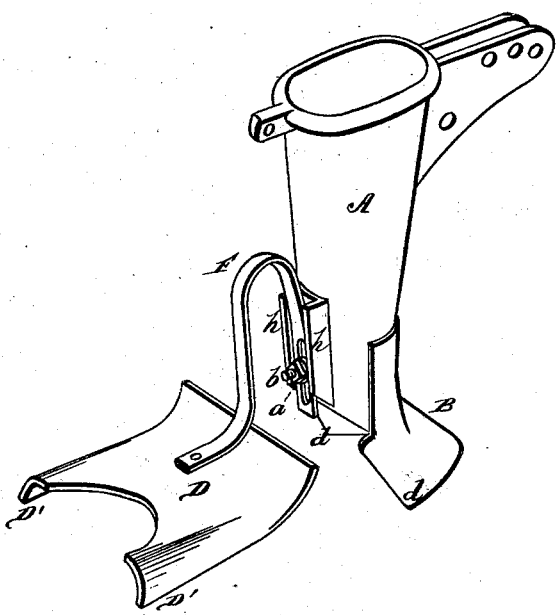
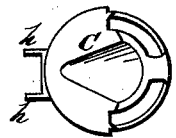
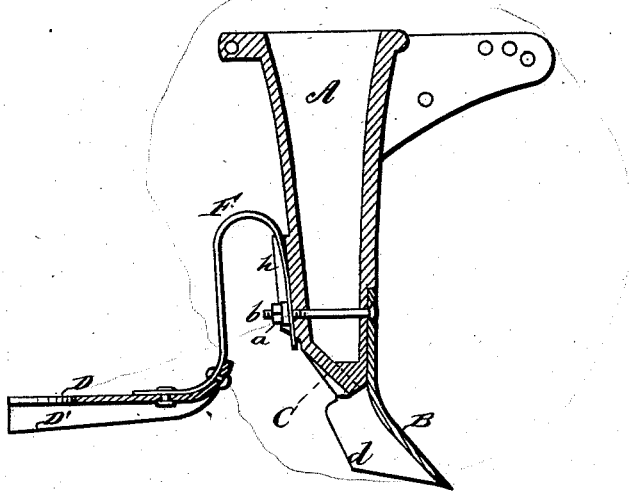
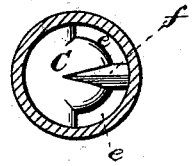
WITNESSES
INVENTOR.
Henry Springer.
ATTORNEYS.

UNITED STATES PATENT OFFICE.

HENRY SPRINGER, OF VICKSBURG, MICHIGAN.

IMPROVEMENT IN SEED-DRILL TEETH.

Specification forming part of Letters Patent No. 203,207, dated April 30, 1878; application filed February 9, 1878.

*To all whom it may concern:*

Be it known that I, HENRY SPRINGER, of Vicksburg, in the county of Kalamazoo and State of Michigan, have invented certain new and useful Improvements in Teeth for Seed-Drills; and I do hereby declare the following to be a full, clear, and exact description thereof, reference being had to the accompanying drawing, and to the letters of reference marked thereon.

The nature of my invention consists in the construction and arrangement of a seed-drill tooth with pulverizer, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of my seed-drill tooth. Fig. 2 is a vertical section. Fig. 3 is a plan view of the seed-distributer, and Fig. 4 is a sectional view of the same.

The object of my invention is to distribute the seed more evenly over a broad surface, and to evenly cover the same, and at the same time pulverize the soil.

A represents the drill-hoe, to the lower end of which the drill-tooth B is secured by a single bolt, $b$, passing through the same, and fastened by a nut, $a$, upon its rear end. The tooth B is of peculiar construction, it being extended rearward on each side, as shown at $d\ d$. This broader rear extension prevents the earth from falling into the furrow until after the seed is distributed.

In the lower end of the hoe A is a seed-distributer, C, extending from the rear portion of the hoe downward and forward, the top of said distributer forming a central V-shaped ridge or flange, $f$; and immediately in rear of the tooth is the armed outlet $e$, to effect a uniform distribution of the seed in the furrow. Without the ridge $f$ the seed would be thicker in the center and thinner toward the outside edges of the furrow; with it the descending seed is separated in the center and thrown outward toward the outside of the furrows, while at the same time a portion naturally rolls back toward the center and covers the space directly under said separator or ridge. Without this central ridge the seed would be deposited mainly in the center of the furrow, and little, if any, at the outside. By means of this device the seed is distributed equally over a surface equal to the width of the furrow made by the drill-tooth, be the same more or less.

On the back of the hoe A are two vertical parallel flanges or guides, $h\ h$, between which is placed one arm of an inverted-U-shaped spring, F. This arm of said spring is slotted longitudinally, and the bolt $b$, above mentioned, passes through said slot, and the spring becomes fastened by tightening the nut $a$.

The other arm of the spring F is bent rearward and riveted or otherwise fastened to the coverer D, which consists of a flat piece of metal of suitable dimensions, having its forward end curved upward and its side edges turned downward gradually from front to rear, forming suitable tapering side flanges D' D'. This coverer is adjustable up and down on the hoe, and acts as a governor to regulate the depth of the furrow, while it also pulverizes the soil and covers the seed.

Having thus fully described my invention, what I claim as new, and desire to secure by Letters Patent, is—

1. A drill hoe or tube having the seed-distributer C extending from the rear portion of the hoe downward and forward, the top of said distributer forming a central V-shaped ridge or flange, $f$, and provided with the curved outlets $e$ on opposite sides thereof, as and for the purposes set forth.

2. A drill hoe or tube provided at its rear end with the vertical parallel flanges or guides $h\ h$, in combination with the slotted inverted-U-shaped spring F and coverer D, as and for the purpose explained.

In testimony that I claim the above I have hereunto subscribed my name in the presence of two witnesses.

HENRY SPRINGER.

Witnesses:
    J. H. BOSTWICK,
    W. MURRAY.